J. C. Stoddard.
Combined Rake & Tedder.
No. 3,481. Reissued June 1, 1869.
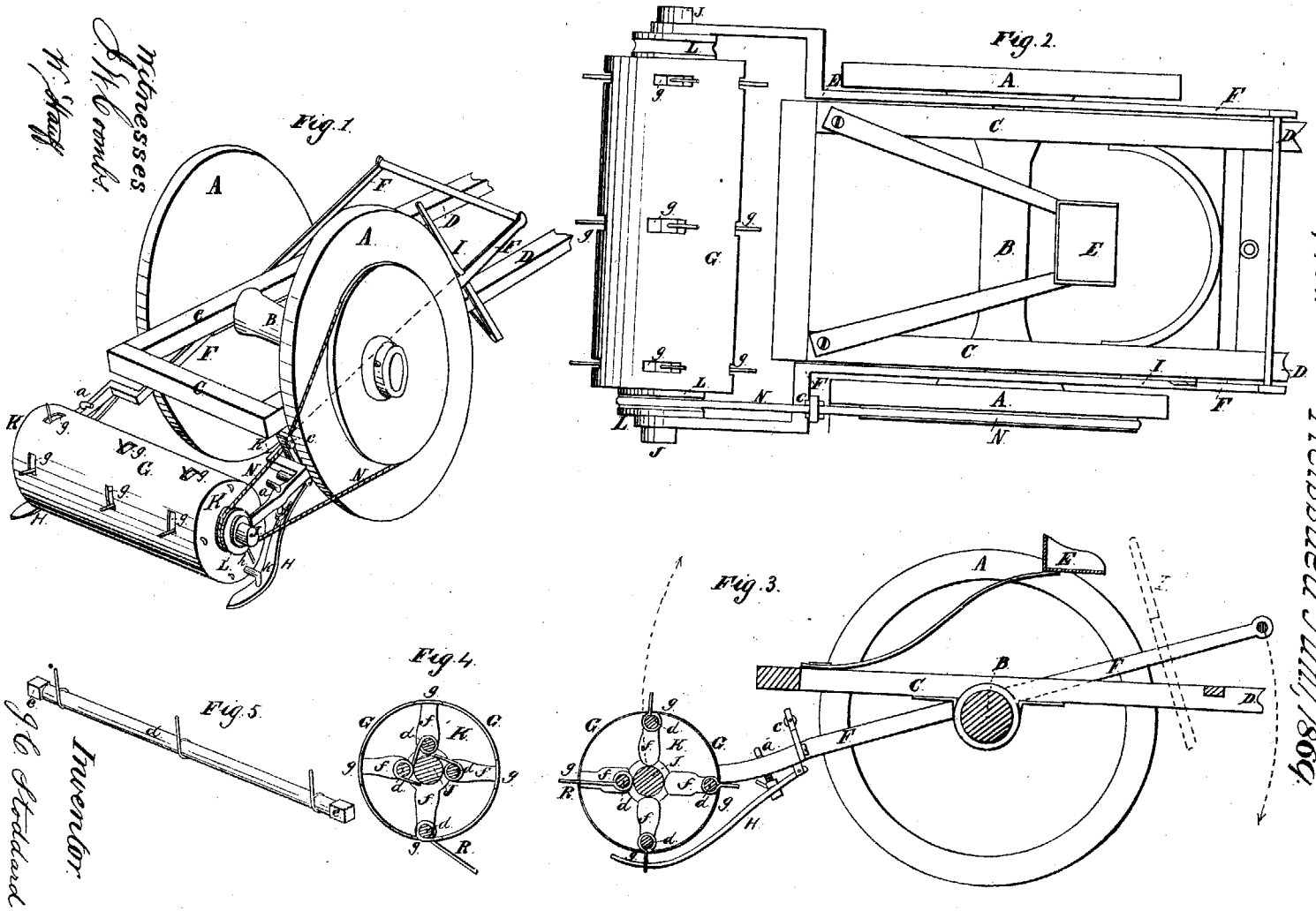
Witnesses
J. W. Coombs.
W. Hauff.
Inventor.
J. C. Stoddard
N. PETERS, PHOTO-LITHOGRAPHER, WASHINGTON, D. C.

UNITED STATES PATENT OFFICE.

J. C. STODDARD, OF WORCESTER, MASSACHUSETTS.

IMPROVEMENT IN HAY-SPREADERS.

Specification forming part of Letters Patent No. 24,588, dated June 28, 1859; Reissue No. 3,481, dated June 1, 1869.

*To all whom it may concern:*

Be it known that I, J. C. STODDARD, of the city and county of Worcester, in the State of Massachusetts, have invented certain new and useful Improvements in Machines for Making Hay, of which the following is a full, clear, and exact description.

The object of the first part of my invention is to render the teeth of a hay-making machine adjustable, so that they may readily be raised or lowered and carried at any desired elevation above the ground; to which end the improvement consists, first, in a novel method of combining a frame connected with the axle of the supporting-wheels with a frame carrying rotating rakes and vibratable about the same axle.

The improvement further consists in a novel method of combining, in a hay-making machine, two wheels, a draft-frame carrying a driver's seat, a vibratable frame carrying rotating rakes, and a catch to lock the two frames together to hold up the rakes, when required.

The improvement further consists in combining a draft-frame carrying the driver with a vibratable frame carrying rotating rakes, which frame can be raised or lowered at pleasure by the driver.

The improvement further consists in a novel method of combining, in a hay-making machine, two wheels, a frame arranged between the wheels and carrying the driver, and a vibratable frame, also arranged between the wheels and carrying rotating rakes.

The object of the next part of my invention is to use a rake wider than the distance between the wheels; and the improvement herein claimed consists in a novel method of combining a frame vibratable or adjustable on the axle of the supporting-wheels with rotary rakes mounted on the frame outside the periphery of the driving-wheel, and raking a swath wider than the distance between the wheels.

The improvement further consists in a novel method of combining a frame vibratable about the axle of the supporting-wheels with rotary rakes driven from the outer side of the driving-wheels.

The object of the next part of my invention is to rotate the rakes continuously while allowing them to be vibrated or adjusted up or down; to which end the improvement consists in a novel method of combining rotating rakes mounted on a frame vibratable about the axle of the supporting-wheels and a main frame with a driving-belt traversing pulleys on the main axle and rake-shaft.

The improvement further consists in a novel method of combining a perforated rotating shield with teeth adjustable radially relatively to the axis of rotation, and so arranged as to be protruded more or less through the shield.

The improvement further consists in a novel method of combining with a hay-making machine rotating rake-teeth, movable radially relatively to their axis of rotation.

The object of the next part of my invention is to convert the machine from a hay-making to a hay-raking machine; to which end the improvement consists in a novel method of combining with rotating teeth a stop to hold the teeth and cause one set of them to act as a rake.

The improvement further consists in a novel method of making one set of radially-adjustable teeth longer than the others, in order that the rake-head may be more elevated when raking than when making hay.

The improvement further consists in a novel method of combining rake-teeth movable radially relatively to their axis with a frame vibratable about the main axle.

In the accompanying drawings, which show all my improvements as embodied in one machine, Figure 1 represents a view in perspective of the machine as arranged for making hay; Fig. 2, a plan or top view of the same; Fig. 3, a vertical longitudinal section through the machine, showing an interior view of the rakes arranged for making hay; Fig. 4, a vertical transverse section through the rakes when arranged for operation as a horse hay-rake; Fig. 5, a view in perspective of one of the rakes detached.

In the drawings two wheels, A A, are shown as revolving on an axle, B. A frame, C, is mounted on this axle between the wheels. An extension of this frame forms the thills D. A seat, E, for the driver is mounted on springs fixed to the frame. Two arms or levers, F, having their fulcra upon the axle B, outside the frame C, extend in front of the axle above the frame, and are connected by a cross-bar so as readily to be operated by the foot of the driver. These levers likewise extend in rear of the axle, beyond the periphery of the wheels, and serve as bearings for the rake-arm G, and constituting what I term a "vibratable" or "adjustable" frame.

The rakes are supported by shoes H, pivoted to the widened-out part of the levers F, and adjusted by means of screw-bolts *a*, which fix the position of the shoes relatively to the drum G, or, in other words, regulate the height at which the rakes are carried. A spring-latch, I, holds the levers F, and consequently the rake-teeth, above the ground when it is necessary to stop the working of the rakes. When the arms F are released by the latch the rakes descend by their own weight and the raking commences.

An arrangement may be attached to the front of the platform, and placed under the control of the driver, for holding the raking-drum in a fixed position during the operation of raking or making hay; but this will be optional in the construction and use of the machine, and not necessary to describe.

The drum for carrying the rakes is composed of a shaft or axle, J, and two cylinder-heads, K K, fixed to the axle near its ends. The axle projects from either side of the heads K and rests in bearings on levers F. Between these bearings and the drum-heads K on the axle J are two pulley-wheels, L, keyed to the axle, and over which pass bands N, which are carried over large driving-pulleys on the sides of the wheels A. These bands are kept tight around the pulleys by adjustable tension-pulleys *c*, fixed to the levers F, and under which pulleys the bands pass. Only one of these bands may be necessary for rotating the drum, and only one is shown in the drawings. The drum-heads K are surrounded by a sheet-metal cylinder, G, and the rakes are inclosed within this cylinder.

The rakes or the rake-heads *d* have square portions *e* formed on either end, as clearly shown by Fig. 5 of the drawings, and these squared portions fit into slots *f f* on the inside of either drum-head K, which slots are enlarged near the axle J, so as to allow the square portions *e e* to turn therein. The rake-heads are all placed within these slots between the two drum-heads, so that their tines or teeth, when protruded, will project through slots *g g* in the cylinder P. They are then fixed in their positions by pins, which pass through the heads and into their ends, and in these positions the machine is used for hay-making. The advantage of this arrangement is as follows: The cylinder serves as a perfect guard to prevent the hay from entangling itself in the tines of the rake, and thereby stop the rotation of the rakes, as is frequently the case with the machines in use. At the same time the proper elasticity of the teeth is preserved and the hay more thoroughly separated. At the same time by this arrangement I am enabled to convert a hay-making machine into a hay-rake by a simple change of the parts, as follows: The tines of one rake are made much longer than those of the others, as represented by Figs. 2, 3, and 4, R being the rake, having the long teeth, which is fixed in the position shown by Fig. 3 when used for making hay, and in the position indicated by Fig. 4 when adapted to raking only, the other rake-teeth being closed up around the axle and held in this position by any suitable device. The motion of the cylinder is here regulated by a pin, *h*, projecting from the pulley L, which strikes the hooked piece *k* on the shoe H and prevents the cylinder from turning. The arms F F are used to raise and lower the cylinder to relieve the rake of its load.

What I claim as my invention, and desire to secure by Letters Patent, is—

1. The combination, in a hay-making machine, of a frame connected with the axle of the supporting-wheels and a frame carrying rotating rakes and vibratable about said axle, the combination being and operating substantially as set forth.

2. The combination, in a hay-making machine, of two wheels, a draft-frame carrying a driver's seat, a vibratable frame carrying rotating rakes, and a catch on the draft-frame to hold up the rakes.

3. The combination, in a hay-making machine, of a draft-frame carrying the driver with a vibratable rake-frame raised or lowered by the driver.

4. The combination, substantially as set forth, in a hay-making machine, of two wheels, a frame arranged between the wheels and carrying the driver, and a vibratable frame also arranged between the wheels and carrying rotating rakes.

5. The combination, in a hay-making machine, of a frame vibratable on the axle of the supporting-wheels with rotary rakes mounted on the frame outside the periphery of the driving-wheels, and making a swath wider than the distance between the wheels.

6. The combination, in a hay-making machine, of a frame vibratable about the axle of the supporting-wheels with rakes rotated from the outer side of the driving-wheel.

7. The combination, in a hay-making machine, of a frame vibratable about the axle of the supporting-wheels and a main frame with a driving-belt traversing pulleys on the axle and rake-shaft, substantially as set forth.

8. The combination, in a hay-making machine, of a perforated rotating shield with rake-teeth adjustable radially relatively to their axis of rotation.

9. The combination, with a hay-making machine, of rotating rake-teeth adjustable relatively to their axis of rotation.

10. The combination, with a hay-making machine having rotating teeth, of a stop to cause the teeth to act as rakes.

11. Making one set of the adjustable rotating rake-teeth longer than the others, for use as a hay-rake, as set forth.

12. The combination, in a hay-making machine, of rake-teeth adjustable radially relatively to their axis of rotation with a frame vibratable about the main axle.

J. C. STODDARD.

Witnesses:

JOE I. PEYTON,

J. J. CHEW.